United States Patent
Gaignon et al.

(10) Patent No.: US 11,794,249 B2
(45) Date of Patent: Oct. 24, 2023

(54) MACHINE FOR MANUFACTURING GREEN PARTS FROM CERAMIC OR METALLIC MATERIAL WITH RECTANGULAR PARALLELEPIPED APPLICATOR

(71) Applicant: S.A.S 3DCERAM-SINTO, Bonnac la Côte (FR)

(72) Inventors: Richard Gaignon, Saint-Vrain (FR); Christophe Chaput, Le-Palais-sur-Vienne (FR); Jean Pastora, Limoges (FR); Jean Luc Soumard, Montaignac-Saint-Hippolyte (FR); Thomas Cointepas, Saint-Just-le-Martel (FR)

(73) Assignee: S.A.S 3DCERAM-SINTO, Bonnac la Côte (FR)

( * ) Notice: Subject to any disclaimer, the term of this patent is extended or adjusted under 35 U.S.C. 154(b) by 112 days.

(21) Appl. No.: 17/535,826

(22) Filed: Nov. 26, 2021

(65) Prior Publication Data
US 2022/0161323 A1 May 26, 2022

(30) Foreign Application Priority Data
Nov. 26, 2020 (FR) ..................... 2012228

(51) Int. Cl.
*B22F 10/12* (2021.01)
*B33Y 30/00* (2015.01)
(Continued)

(52) U.S. Cl.
CPC .............. *B22F 10/12* (2021.01); *B22F 12/50* (2021.01); *B28B 1/001* (2013.01); *B33Y 30/00* (2014.12)

(58) Field of Classification Search
None
See application file for complete search history.

(56) References Cited

U.S. PATENT DOCUMENTS 3,051,567 A * 8/1962 Ziegler ..................... B22F 3/04
425/DIG. 26
5,248,249 A * 9/1993 Yamamoto ............ B29C 64/357
118/620
(Continued)

FOREIGN PATENT DOCUMENTS

CA 2859414 A1 * 10/2015 ............ B22F 3/1017
CN 106622413 A * 5/2017 ........ B01L 3/502761
(Continued)

OTHER PUBLICATIONS

WO-2015137184-A1 translation (Year: 2023).*
(Continued)

*Primary Examiner* — Xiao S Zhao
*Assistant Examiner* — Guy F Mongelli
(74) *Attorney, Agent, or Firm* — NIXON & VANDERHYE (57) ABSTRACT

This machine includes a horizontal receiving surface which is constituted by the bottom of a vat, the vat having a width and a length, and a device for supplying and spreading a suspension which includes a suspension applicator and an external tank, the applicator including a suspension reserve fed from the external tank, at least one vacuum-forming device in the reserve and at least one hole connected to the reserve and formed facing the surface the vacuum forming device being controlled to regulate the amount of suspension released from the hole, the applicator being arranged along the width of the vat and having at least the printing width and being configured to translate along the length of the vat to be able to apply suspension through the hole onto the surface.

16 Claims, 9 Drawing Sheets

(51) Int. Cl.
*B22F 12/50* (2021.01)
*B28B 1/00* (2006.01)

(56) References Cited

U.S. PATENT DOCUMENTS

| | | | |
|---|---|---|---|
| 5,922,364 A | 7/1999 | Young, Jr. | |
| 5,980,812 A | 11/1999 | Lawton | |
| 10,562,226 B1* | 2/2020 | Cohen | B33Y 10/00 |
| 2005/0056913 A1* | 3/2005 | Farnworth | B29C 64/106 |
| | | | 438/362 |
| 2007/0075461 A1* | 4/2007 | Hunter | B29C 64/245 |
| | | | 425/174 |
| 2011/0309554 A1* | 12/2011 | Liska | B29C 64/135 |
| | | | 264/401 |
| 2016/0046075 A1* | 2/2016 | DeSimone | B33Y 30/00 |
| | | | 425/114 |
| 2017/0106594 A1* | 4/2017 | Gardiner | B29C 70/384 |
| 2017/0326803 A1* | 11/2017 | Chanclon | B29C 64/357 |
| 2017/0368816 A1* | 12/2017 | Batchelder | B29C 35/0266 |
| 2018/0141151 A1* | 5/2018 | Liang | B23K 11/0013 |
| 2018/0333913 A1* | 11/2018 | Lin | B29C 64/264 |
| 2018/0361502 A1* | 12/2018 | Roerig | B23K 26/127 |
| 2019/0099807 A1* | 4/2019 | Jones | B33Y 40/00 |
| 2021/0008757 A1 | 1/2021 | Chaput et al. | |
| 2021/0162657 A1* | 6/2021 | Chartrain | B29C 64/135 |

FOREIGN PATENT DOCUMENTS

| | | | | |
|---|---|---|---|---|
| CN | 208 343 464 | | 1/2019 | |
| EP | 1 847 377 | | 10/2007 | |
| JP | H06305031 | * | 11/1994 | B28B 11/14 |
| JP | 08150662 A | * | 6/1996 | B29C 64/153 |
| JP | 4426060 B2 | * | 3/2010 | B01J 19/0046 |
| JP | 2012505774 A | * | 3/2012 | B01L 3/502761 |
| WO | WO-2004061418 A2 | * | 7/2004 | B01J 19/0046 |
| WO | WO-2015137184 A1 | * | 9/2015 | B28B 11/14 |

OTHER PUBLICATIONS

CA-2859414-A1 translation (Year: 2023).*
JP H06305031 (Year: 2023).*
JP-08150662-A (Year: 2023).*
JP-4426060-B2 (Year: 2023).*
CN-106622413-A (Year: 2023).*
WO-2004061418-A2 (Year: 2023).*
JP 2012505774 (Year: 2023).*
WO-2015137184-A1 (Year: 2023).*
CA-2859414-A1 (Year: 2023).*
Search Report and Written Opinion issued in French Patent No. 2012228, dated Jul. 30, 2021, 8 pages.

* cited by examiner

MACHINE FOR MANUFACTURING GREEN PARTS FROM CERAMIC OR METALLIC MATERIAL WITH RECTANGULAR PARALLELEPIPED APPLICATOR

This application claims priority to FR Application No. 2012228, filed Nov. 26, 2020, the entire contents of which is hereby incorporated by reference.

BACKGROUND OF THE INVENTION

Field of the Invention

The present invention relates to a machine for the manufacture of green parts of ceramic or metallic material by stereolithography, such green parts being intended to be subjected to cleaning, debinding and sintering operations to obtain finished ceramic or metallic parts.

Description of the Related Art

Stereolithography generally involves the following steps to obtain these green parts:
- a computer model of the part to be manufactured is constructed by computer-aided design, the dimensions of which are slightly larger than those of the part to be manufactured in order to allow for shrinkage of the ceramic or metallic material during the manufacture of the part; and
- the part is manufactured as follows:
  - a first layer of a curable composition is formed on a rigid support, comprising the said ceramic or metallic material formed by at least one ceramic or metallic powder, respectively, and an organic part comprising at least one monomer and/or one oligomer and at least one initiator of the polymerization of the said monomer(s) and/or oligomer(s), and, if appropriate, at least one of a plasticizer, a solvent, a dispersant and a polymerization inhibitor,
  - the first layer of the photocurable composition is cured by irradiation (e.g. by laser scanning of the free surface of said layer or by a diode projection system) in a pattern defined from the model for said layer, forming a first stage;
  - a second layer of the curable composition is formed on the first layer;
  - the second layer of the curable composition is cured by irradiation in a pattern defined for the said layer, forming a second stage, this irradiation being carried out as for the first layer;
  - optionally, the above steps are repeated to obtain the part in its green state.

Then, as mentioned above, to obtain the finished part, the green part is cleaned to remove the uncured composition; the cleaned green part is debinded; and the cleaned and debinded green part is sintered to obtain the finished part.

The curable composition may be in the form of a suspension. The rigid support is a working plate supporting the various layers of the part being built and the suspension, and each of the layers is generally formed by lowering the working plate and spreading a predefined thickness of suspension. A supply of suspension is stored in tanks (vats or cartridges or pressure pots) which are automatically emptied of a predefined amount of suspension at each layer. This creates a bead of suspension to be spread on the top layer of the part being manufactured which will have been previously lowered by the working plate. Each layer is usually spread by a scraper that sweeps the working surface of the working plate, for example by moving in a straight horizontal direction.

Each time a layer is formed, the strand emerges from its tank to extend across the width of the plate between the plate and the scraper to a height calculated so that the plate can be covered with the suspension forming the layer as the scraper advances.

This system is not feasible for large machines because:
- the suspension bead, pushed by the scraper along the length of the plate, will hit the polymerised parts, which are fragile, generating too much stress on the parts;
- it is very difficult to ensure that the bead is of uniform height across its width, so there is a risk that the plate will not be properly covered, prompting the use of much more suspension than is necessary to avoid this risk. This generates additional effort.

It was proposed by the Applicant that the suspension should be fed through a nozzle in front of the scraper over its entire width. While this solution solves the problem of width distribution, the problem of length distribution remains to be solved for large plates, as the continuous supply of suspension during the movement of the scraper is made more complicated. If the scraper is stopped at certain times to apply a new suspension strand, surface defects on the parts, i.e. marks at the location of the stops, are generated; and if a continuous suspension strand is applied in front of the scraper, this operation is difficult to control over the entire width during the entire advance of the scraper, leading to the application of more suspension than necessary, generating additional efforts.

To overcome these disadvantages, the Applicant proposed that the supply and spreading of the suspension on the horizontal receiving surface for the first layer and on each layer with a previously cured pattern for each other layer should be carried out by an applicator system with a suspension reserve fed from an external tank, the stacking of layers taking place in a vat which fills up with suspension at each layer formation.

SUMMARY OF THE INVENTION

Thus, according to the invention, the deposition of suspension can be carried out in a controlled manner, advantageously over the entire width and length of the layers without excess suspension as in the previously described situations of the prior art.

Moreover, the progressive filling of the vat offers advantages compared to the case of working with a vat initially filled with the suspension into which a plate supporting the stack is lowered step by step at each layer formation in order to cover the layer with a cured pattern with a new layer to be irradiated. These advantages are to avoid a drop in the reactivity of the suspension as a result of an exchange with the ambient temperature, to avoid sedimentation of the ceramic or metallic part of the suspension at the bottom of the vat, and to avoid a high shear stress which would be necessary to lower a too high viscosity level of the suspension to allow it to cover the layers to be irradiated.

The object of the present invention is therefore a machine for manufacturing parts by the stereolithography technique, according to which layers of radiation-curable suspension are successively cured one on top of the other by irradiation according to a pattern defined for each layer, said machine comprising:

a horizontal receiving surface, configured to receive the first layer and subsequent layers formed on top of each other from the first layer;

a supply and spreading device configured to, at each layer formation, supply a quantity of suspension and spread it on said horizontal receiving surface for the first layer, and on each previously cured patterned layer for each of the subsequent layers, the supply and spreading device and the horizontal receiving surface being movable relative to each other in the direction of layer stacking; and an irradiation device for irradiating each layer after it has been spread to cure it in the previously defined pattern, characterized in that the horizontal receiving surface is constituted by the bottom of a vat, said vat having a length and a width, and in that said supply and spreading device comprises a suspension applicator and an external tank, the suspension applicator comprising a suspension reserve fed from the external tank, at least one vacuum forming device in the suspension reserve, and at least one hole connected to the suspension reserve and formed facing the horizontal receiving surface, said at least one vacuum forming device being controlled to regulate the amount of suspension released from said at least one hole, the suspension applicator being disposed along the width of the vat and having at least the printing width and being configured to translate along the length of the vat to be able to apply suspension through said at least one hole onto the receiving surface.

According to a particular embodiment of the machine according to the invention, said at least one vacuum forming device is connected to a vacuum tapping to control the amount of suspension released from said at least one hole.

The applicator may be a rectangular parallelepiped, the active face facing the horizontal receiving surface being the release face of the applicator in which said at least one hole is formed.

Said at least one formed hole, which is formed in the active face, may be constituted by a single slit formed over the entire width of the active face of the applicator or by a plurality of holes uniformly distributed over the entire width of the active face of the applicator.

The suspension can be supplied to the suspension reserve by a number of feeds from the external tank, uniformly distributed over the width of the applicator, with internal suspension distribution tubes being able to be mounted dipping into the suspension reserve.

The suspension reserve can advantageously be divided into compartments, each of which is associated with a vacuum formation device by at least one vacuum tapping and at least one supply of suspension from the external tank. Thus each compartment has its own supply system and its own vacuum system. The advantage is that if one compartment becomes empty of suspension for any reason, this does not disturb the others. It has also been found that this arrangement allows for a better control of the level of suspension in the suspension applicator.

The machine may comprise a device for controlling the supply of suspension to the suspension reserve cavity while the applicator is stationary, in particular at a transverse edge of the layers, or during its translational movement. The advantage of supplying suspension while the applicator is moving is to minimise the amount of suspension in front of the applicator, which can cause mechanical stress on the parts or beading problems during curing, generating interference with the applicator later.

The machine according to the invention may comprise a sensor for the quantity of uncured suspension in the vat, and a controller regulating, for each layer, the supply of suspension by the applicator as a function of the level of uncured suspension detected in the vat by the suspension quantity sensor.

The suspension quantity sensor can be one of a level sensor and a volume sensor.

The active face of the applicator may carry at least one blade configured to allow scraping of the suspension deposited through the said at least one hole, the said blade being located set back from the said at least one hole in the direction of movement of the applicator.

The front face of the applicator in the direction of movement may have the form of a pushing shield.

The vat can be equipped with an overflow for discharging excess uncured suspension. The overflow can be controlled as a function of the level of suspension detected by the sensor of the quantity of uncured suspension in the vat.

BRIEF DESCRIPTION OF THE DRAWINGS

To better illustrate the object of the present invention, a particular embodiment is described below, by way of indication and not as a limitation, with reference to the attached drawing.

On this drawing.

DESCRIPTION OF THE PREFERRED EMBODIMENTS

Referring to FIGS. 1 to 5, it can be seen that a suspension applicator 1 is shown having the general shape of a rectangular parallelepiped formed by an elongated upper plate 2, horizontal in the position of use, bent downwards at each of its ends to form transverse plates 3 of greater thickness. On each side of these walls 2 and 3, a side plate 4 is fixed by screws 5.

Figure 1:
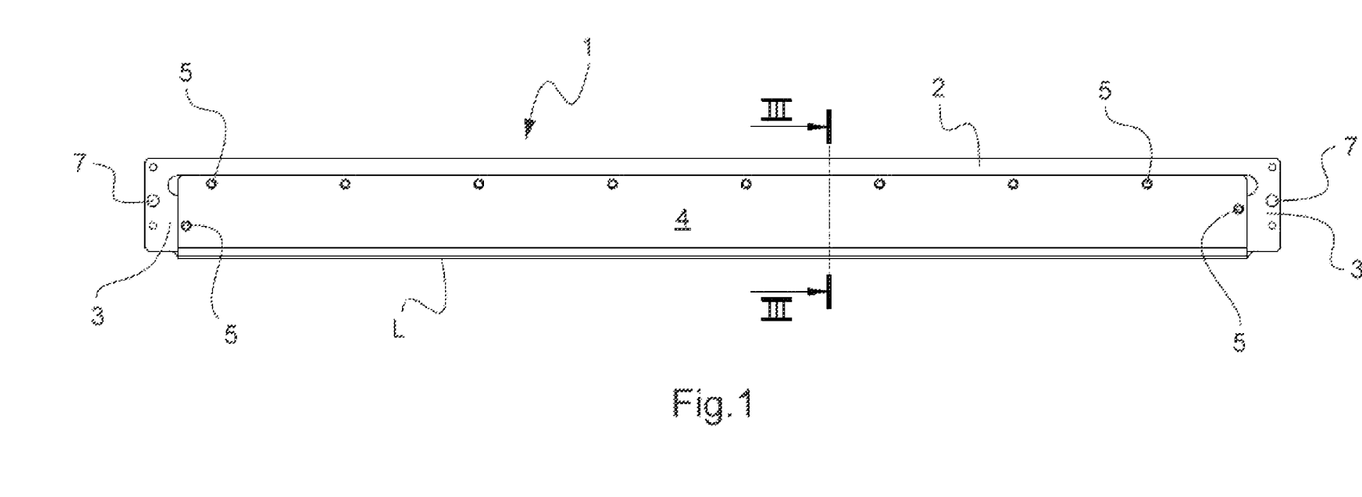
FIG. 1 is a front elevation view of a suspension applicator of a machine according to the invention.
Figure 2:
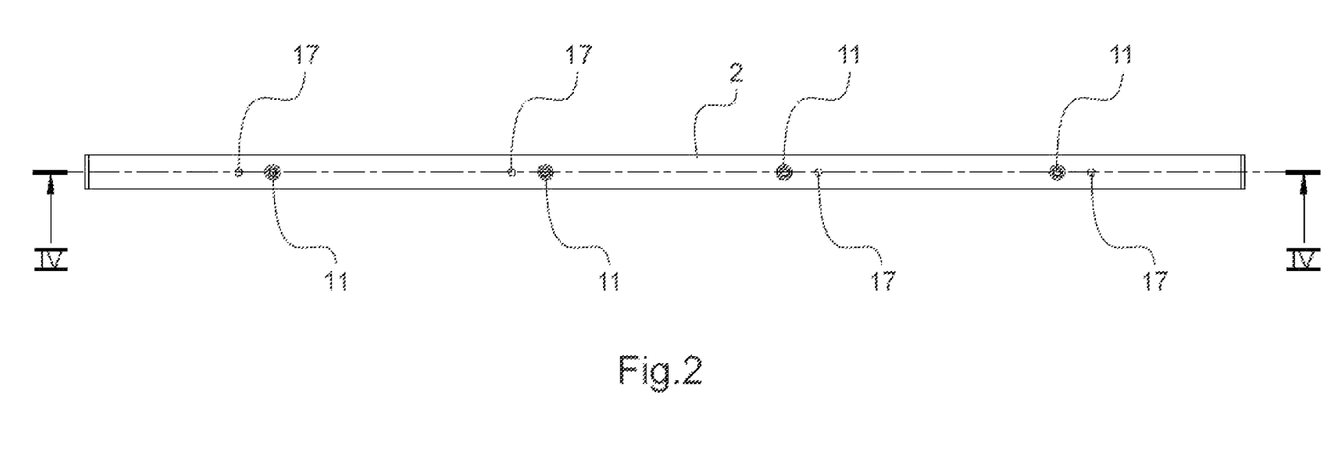
FIG. 2 is a top view of the device of FIG. 1.
Figure 3:
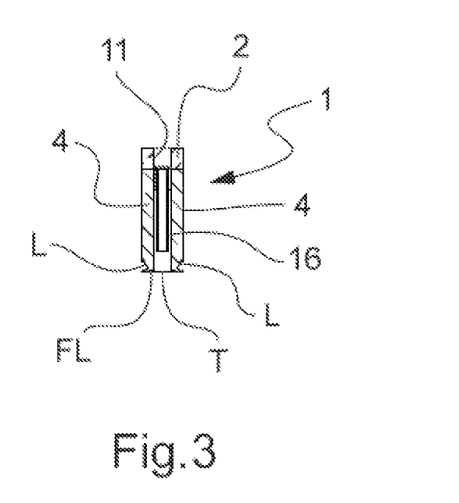
FIG. 3 is a cross-sectional view according to III-III of FIG. 1.
Figure 4:
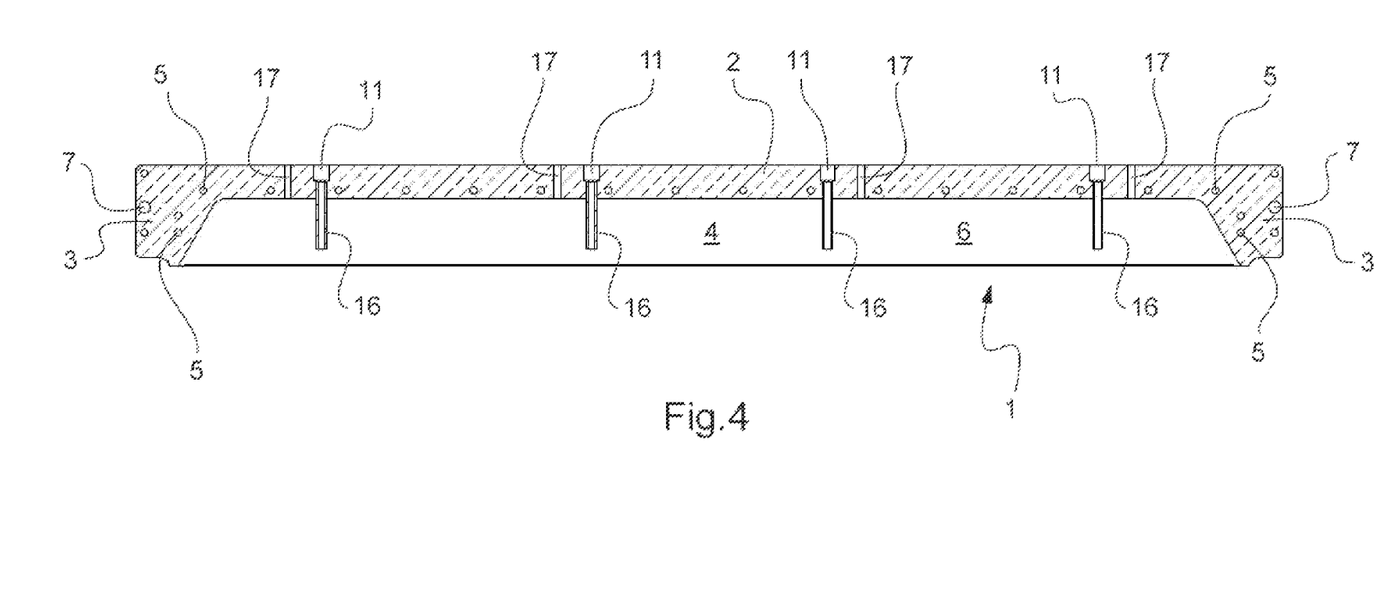
FIG. 4 is a longitudinal sectional view according to IV-IV of FIG. 2.

A suspension reserve 6 (FIG. 4) is thus formed, which is delimited by the plates 2, 3 and 4, the lower face or release face (FL) being formed by the edges of the plates 3 and 4 and having a slit-shaped hole T (see FIG. 3).

The transverse plates 3 have holes 7 for the passage of fixing screws on an applicator holder 8. The applicator holder 8, with its applicator 1, is slidably mounted on rails 9 which frame a horizontal receiving surface 10 (see FIG. 5).

Recesses 11 are provided in the top plate 2, each of which is suitable for receiving an end fitting 12 of a hose 13. The hoses 13 are connected to an intermediate connection 14 from which a hose 15 extends, the two hoses 15 being joined to an intermediate connection (not shown) from which a hose for connection to an external suspension tank (R in FIG. 6) extends.

The recesses 11 are each connected to an internal suspension distribution tube 16 which dips into the reserve 6.

The supply of suspension to the reserve 6 is controlled by a device (not shown) which is programmed to open a dispensing valve or valves to supply suspension for example while the applicator 1 is stationary, in particular at a transverse edge of the receiving surface.

Figure 5:
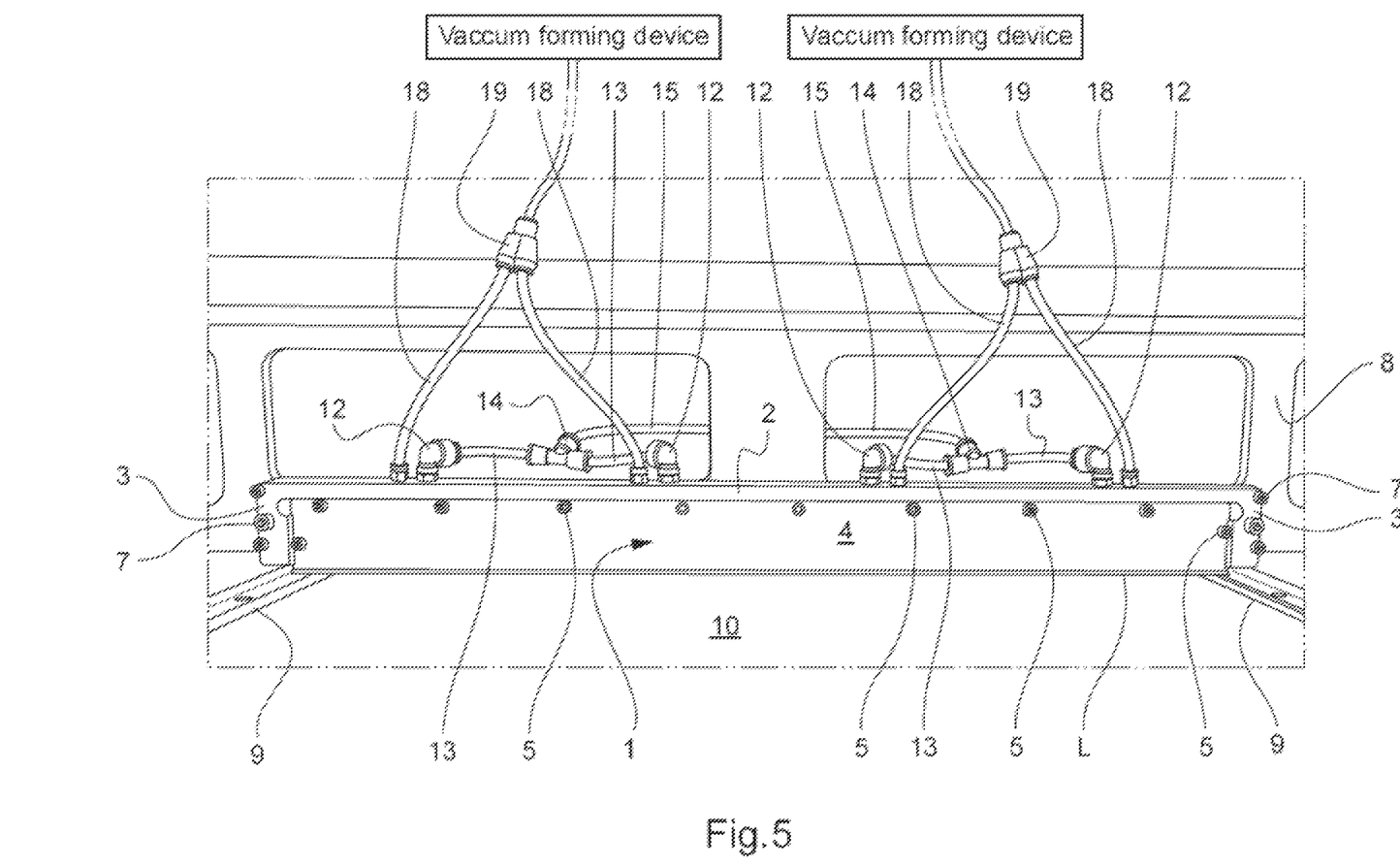
FIG. 5 is a front view of the applicator of FIG. 1 in place in the machine according to the invention.

The plate 2 also has vacuum tappings 17 which are connected in pairs by hoses 18 to an intermediate connection 19 from which a connection to a vacuum forming device, as shown in FIG. 5, is made.

Each of the plates 4 has a scraping blade L along its lower edge in the example shown, this having here the form of a pushing shield (FIG. 3). Details of this form can be found in the French patent application filed on 8 Jul. 2019 in the name of the present applicant and having the title "Device for applying layers of paste for a machine for manufacturing ceramic pieces by stereolithography". Other shapes of scraping blades can be used, such as bevelled blades, for example with a high entry angle (e.g. 45°) or, if laminar flow is to be promoted, with a smaller entry angle.

In the example shown, the suspension applicator has two blades L, each of which is active in one of the two directions of movement.

The machine according to the invention works as follows:
(a) formation of a first layer C of suspension in the bottom of a vat (B) (FIG. 6) by moving the applicator 1, the reserve 6 of which has been previously filled from the tank R; a vacuum is necessary in this operation to avoid any undesired deposition of suspension and to regulate this deposition;
(b) hardening of the first layer according to the desired pattern;
(c) lifting the applicator 1 by one layer height;
(d) formation of the second layer C by moving the applicator 1 in the opposite direction;
(e) hardening of the second layer C;
with the repetition of steps (c) and (e) for the construction of the green part.

Figure 6:
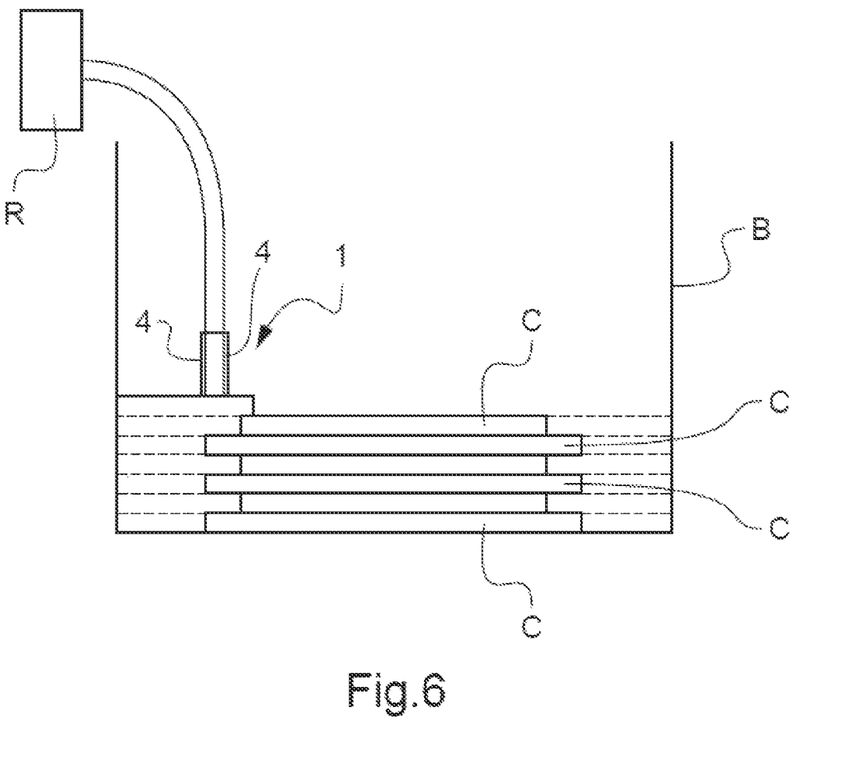
FIG. 6 is a schematic view illustrating the operation of the machine according to the invention.

FIG. 6 shows a machine according to the invention in which the applicator 1 rises by one layer each time from the bottom of the vat B.

Figure 7A:
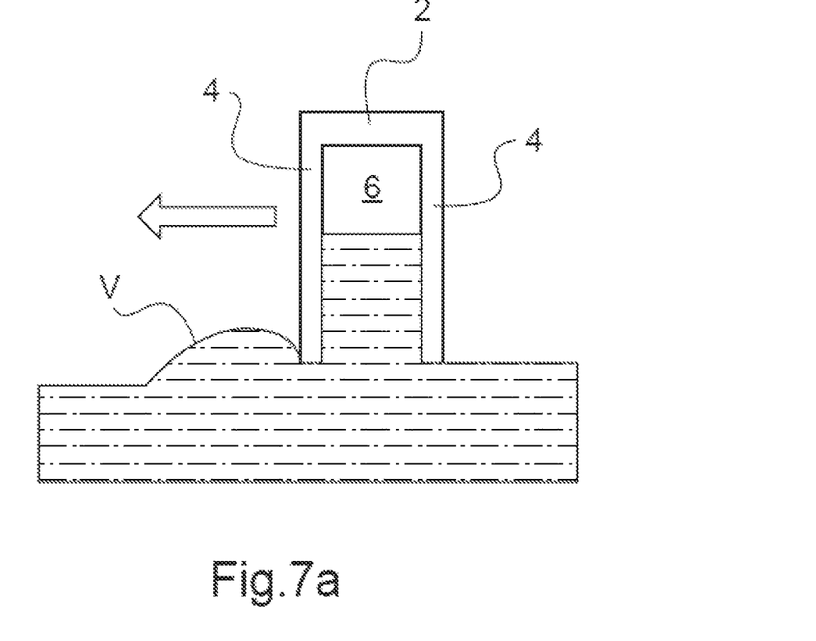
FIG. 7a illustrates the formation of a layer as the suspension applicator advances.
Figure 7B:
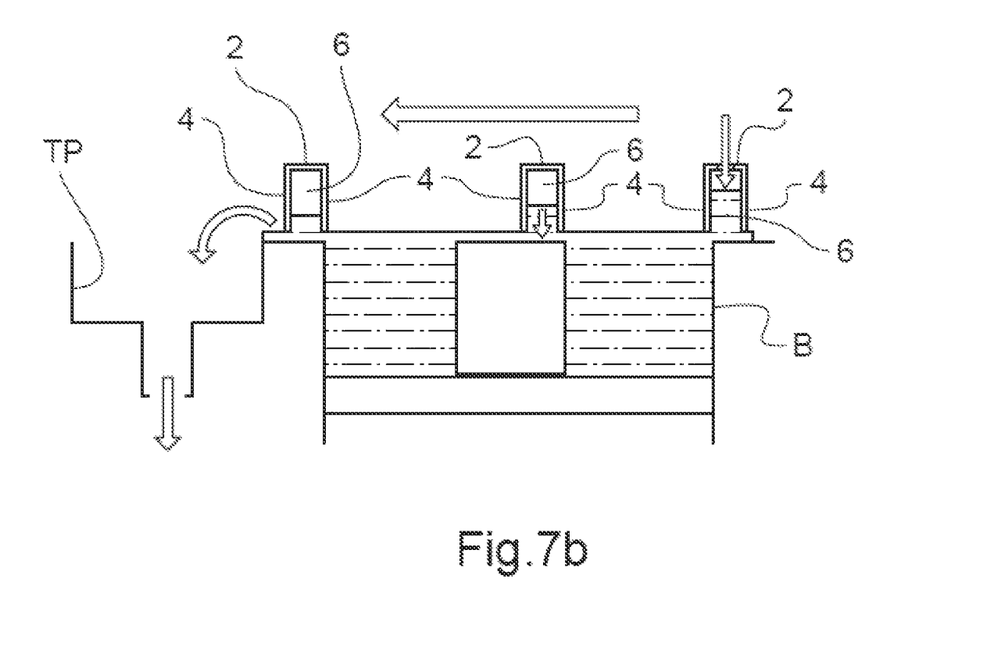
FIG. 7b illustrates the formation of a layer seen in the vat of the machine.
Figure 7C:
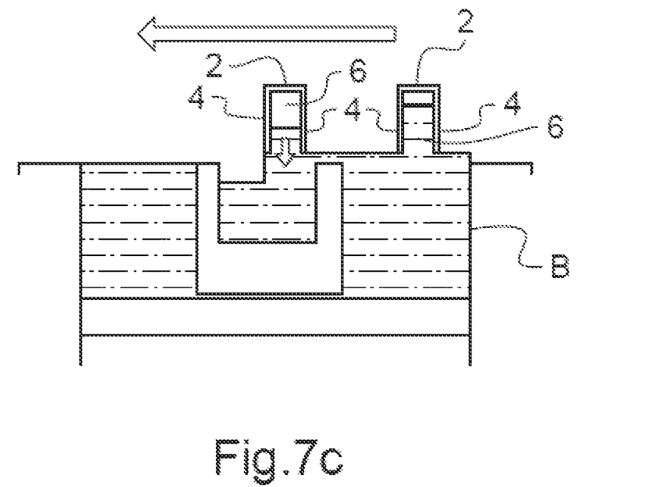
FIG. 7c illustrates the formation of a layer with additional material.
Figure 7D:
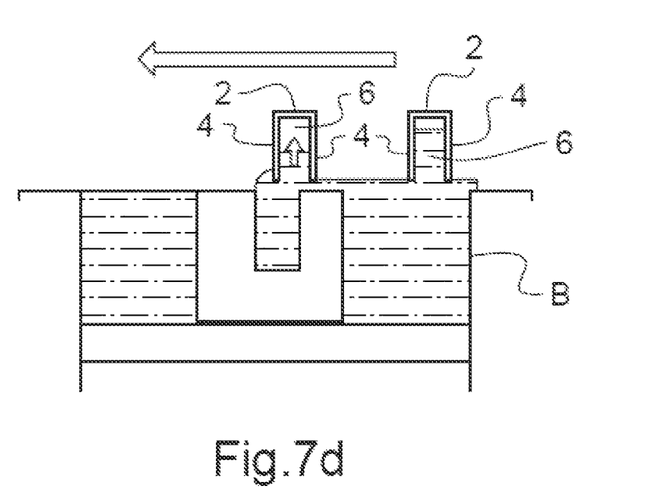
FIG. 7d shows the formation of a layer with suction of excess material d)

Alternatively, the working surface may be lowered as shown in FIG. 7b, 7c or 7d. In other words, it is the bottom of the vat that descends at each layer formation.

Referring now to FIG. 7a, it can be seen that as the applicator 1 deposits suspension on the previous layer from the suspension reserve 6, a wave V is formed at the front of the applicator which is scraped off by the front blade.

Referring to FIG. 7b, which shows the applicator 1 in its initial position (filling the reserve 6), in an intermediate position (during the actual deposit), and in its final position (after the deposit), it can be seen that an overflow TP has been provided on the edge of the tank opposite the starting position. The suspension that falls into the overflow TP can advantageously be returned to the external tank R.

Referring to FIG. 7c, it can be seen that a situation has been represented in which the level of a previous layer in an uncured location is too low compared to the rest of the layer. In this case, the supply of the missing suspension material is conducted.

Referring to FIG. 7d, it can be seen that a situation has been represented in which the level of a previous layer in an uncured location is too high compared to the rest of the layer. In this case, the suction of the excess slurry material is conducted.

Figure 8:
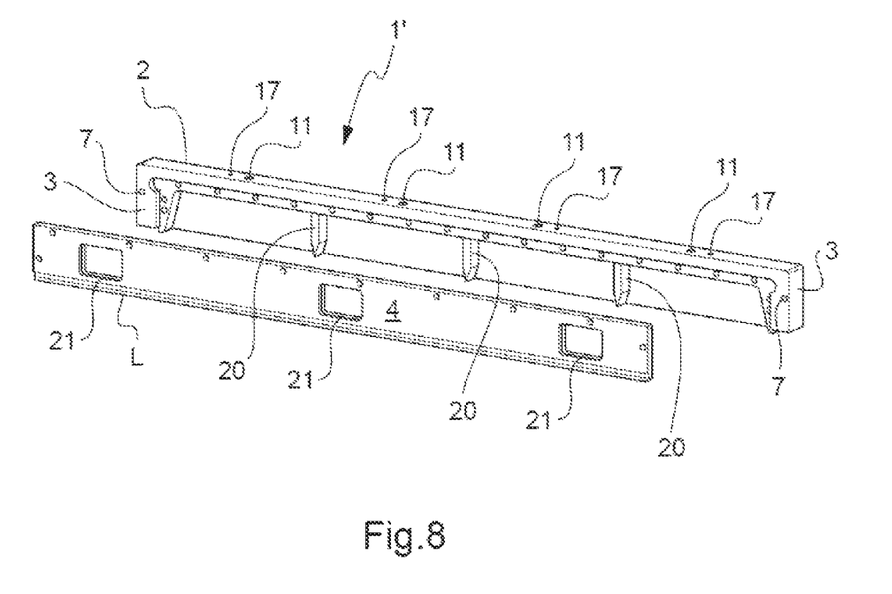
FIG. 8 is an exploded perspective view of a suspension applicator of a machine according to the invention, said applicator being in accordance with a variant of that shown in FIGS. 1 to 4.

Referring to FIG. 8, it can be seen that an applicator 1' is shown which differs from applicator 1 in that the suspension reserve 6 is divided into compartments (four in the example shown) by three partitions 20 perpendicular to the top plate 2 and extending downwards to the vicinity of the suspension outlet slit T.

The components of applicator 1' identical to those of applicator 1 are designated by the same reference numbers.

The compartments formed by the partitions 20 are of substantially the same volume and each is supplied with suspension by a hose similar to a hose 13 as shown in FIG. 5, and is connected to a vacuum forming device by a vacuum tapping 17.

In the example shown, the partitions 20 are bevelled at the bottom to facilitate the exit of suspension from each of the compartments.

Not shown in FIG. 8 are the internal distribution tubes 16 mounted internally in the recesses 11 receiving an end fitting 12 of a hose 13.

Thus each compartment has its own supply system and vacuum system, allowing the supply and vacuum to be controlled compartment by compartment.

Also shown in FIG. 8 are control windows 21 which can, if desired, be made into the front wall 4 to observe the behaviour of the suspension during its deposition.

The invention claimed is:

1. A machine for manufacturing parts by the stereolithography technique, according to which layers of radiation-curable suspension are successively cured one on top of the other by irradiation according to a pattern defined for each layer, said machine comprising:
a horizontal receiving surface, configured to receive the first layer and subsequent layers formed on top of each other from the first layer;
a supply and spreading device configured to, at each layer formation, supply a quantity of suspension and spread the suspension on said horizontal receiving surface for the first layer, and on each previously cured patterned layer for each of the subsequent layers, the supply and spreading device and the horizontal receiving surface being movable relative to each other in the direction of layer stacking; and
an irradiation device for irradiating each layer after said layer has been spread to cure said layer in the previously defined pattern,
wherein the horizontal receiving surface is constituted by the bottom of a vat, said vat having a length and a width, and wherein said supply and spreading device comprises a suspension applicator and an external tank, the suspension applicator comprising a suspension reserve fed from the external tank, at least one vacuum forming device in the suspension reserve and at least one hole connected to the suspension reserve and formed facing the horizontal receiving surface, said at least one vacuum forming device being controlled to regulate the amount of suspension released from said at least one hole, the suspension applicator being disposed along the width of the vat and having at least the printing width and being configured to translate along the length of the vat to be able to apply suspension through said at least one hole onto the receiving surface, wherein the applicator is a rectangular parallelepiped and has an active face, the active face facing the horizontal receiving surface, the active face being a release face of the applicator in which said at least one hole is formed.

2. The machine according to claim 1, wherein said at least one vacuum forming device is connected to a vacuum tapping to control the amount of suspension released from said at least one hole.

3. The machine according to claim 2, wherein the suspension reserve is divided into compartments each associated with a vacuum formation device by at least one vacuum tapping and with at least one supply of suspension from the external tank.

4. The machine according to claim 2, further comprising a device for controlling the supply of suspension to the suspension reserve cavity while the applicator is stationary or during the applicator's translational movement.

5. The machine according to claim 1, wherein said at least one hole which is formed in the active face is constituted by a single slit formed over the entire width of the active face of the applicator or by a plurality of holes uniformly distributed over the entire width of the active face of the applicator.

6. The machine according to claim 5, wherein the active face of the applicator carries at least one blade configured to allow scraping of the suspension deposited through the said at least one hole, the said blade being located set back from the said at least one hole in the direction of movement of the applicator.

7. The machine according to claim 5, wherein the front face of the applicator in the direction of movement has the form of a pushing shield.

8. The machine according to claim 5, wherein the suspension is supplied to the suspension reserve by several supplies from the external tank, uniformly distributed over the width of the applicator, internal suspension distribution tubes being able to be mounted dipping into the suspension reserve.

9. The machine according to claim 5, wherein the suspension reserve is divided into compartments each associated with a vacuum formation device by at least one vacuum tapping and with at least one supply of suspension from the external tank.

10. The machine according to claim 1, wherein the suspension is supplied to the suspension reserve by several supplies from the external tank, uniformly distributed over the width of the applicator, internal suspension distribution tubes being able to be mounted dipping into the suspension reserve.

11. The machine according to claim 10, wherein the suspension reserve is divided into compartments each associated with a vacuum formation device by at least one vacuum tapping and with at least one supply of suspension from the external tank.

12. The machine according to claim 1, wherein the suspension reserve is divided into compartments, each of the compartments associated with the vacuum formation device by at least one vacuum tapping and with at least one supply of suspension from the external tank.

13. The machine according to claim 1, further comprising a suspension quantity sensor for the quantity of uncured suspension in the vat, and a controller regulating, for each layer, the supply of suspension by the applicator as a function of the level of uncured suspension detected in the vat by the suspension quantity sensor.

14. The machine according to claim 13, wherein the vat is equipped with an overflow for discharging excess uncured suspension.

15. The machine according to claim 14, wherein the overflow is controlled as a function of the level of suspension detected by the sensor of the quantity of uncured suspension in the vat.

16. The machine according to claim 13, wherein the suspension quantity sensor is one of a level sensor and a volume sensor.

* * * * *